United States Patent
Shauo et al.

(10) Patent No.: US 7,700,150 B2
(45) Date of Patent: Apr. 20, 2010

(54) METHOD FOR PREPARATION OF DIFFUSION SHEET

(75) Inventors: Chang-Neng Shauo, Longtan Township, Taoyuan County (TW); Hsiou-Jeng Shy, Sanchong (TW); Hsien-Ming Wu, Longtan Township, Taoyuan County (TW); Hung-Fang Huang, Dasi Township, Taoyuan County (TW); Wen-Yung Shu, Sindian (TW)

(73) Assignee: Chung Shan Institute of Science and Technology, Armaments Bureau, M.N.D., Taoyuan County (TW)

( * ) Notice: Subject to any disclaimer, the term of this patent is extended or adjusted under 35 U.S.C. 154(b) by 321 days.

(21) Appl. No.: 11/806,095

(22) Filed: May 30, 2007

(65) Prior Publication Data

US 2008/0299304 A1 Dec. 4, 2008

(51) Int. Cl.
  *B05D 5/06* (2006.01)

(52) U.S. Cl. .......................................... 427/162; 427/58
(58) Field of Classification Search ................ 427/162, 427/58
  See application file for complete search history.

(56) References Cited

U.S. PATENT DOCUMENTS

| 6,762,233 B2 * | 7/2004 | Chaiko .................... 524/445 |
| 6,844,047 B2 * | 1/2005 | Kaminsky et al. ........... 428/141 |
| 2006/0109682 A1 * | 5/2006 | Ko et al. .................... 362/607 |

* cited by examiner

*Primary Examiner*—Frederick J Parker
(74) *Attorney, Agent, or Firm*—Rosenberg, Klein & Lee

(57) ABSTRACT

A low cost and simple method for preparation of diffusion sheets comprising the steps of swelling, wetting and dispersing nano-scale clay, toluene, and a dispersant to form a paint. The paint is then coated on a surface of a polymer substrate by a wet coating process to form a diffusion layer which includes the nano-scale clay as diffusion particles.

4 Claims, 1 Drawing Sheet

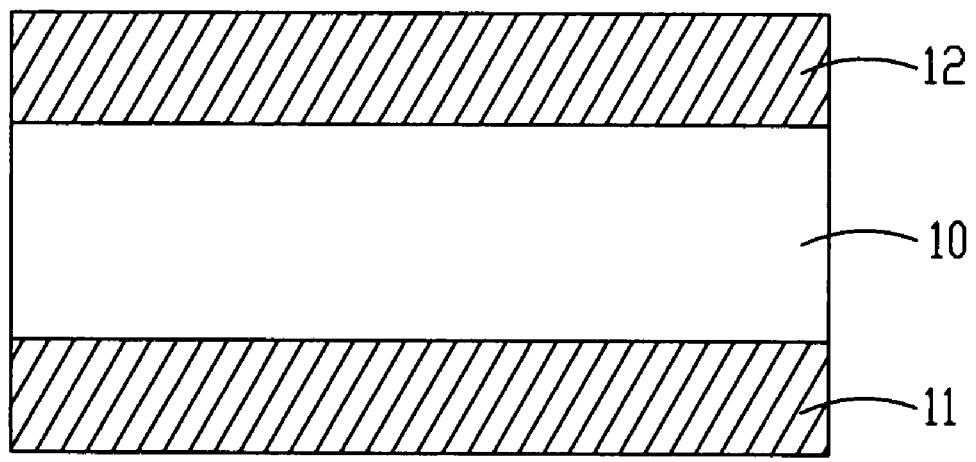

METHOD FOR PREPARATION OF DIFFUSION SHEET

BACKGROUND OF THE INVENTION

The present invention relates to a method for preparation of diffusion sheets, especially to a low cost and simple method for preparation of diffusion sheets that are abrasion and scratch resistant.

A liquid crystal display (LCD) device includes a backlight module for providing backlight to the LCD device. The backlight module consists of a light source and optical sheet having light guide plate, diffusion sheets and prism sheets. The diffusion sheet is usually attached below the LCD panel, in order to disperse light beams received from the light source and provide uniform light for the LCD panel. The uniform light enables the LCD panel to display a clear image. Conventional diffusion sheet is made by adding a plurality of chemical granules inside substrate (transparent polymer) that work as scattering particles. The diffusion sheet available now includes microparticles dispersed between resin layers. While light beams passing through the diffusion layer, they are reflected and scattered continuingly between the two substrates with different refractive indices so as to achieve light diffusion effect.

Refer to U.S. Pat. No. 6,888,663, after swelling, wetting pretreatment, and interface modification, diffusion particles made from clay is mixed with polymer through a thermal process to produce diffusion sheets. The clay achieves excellent effect (Haze about 80% and light transmittance about 80%) with only a little amount of clay (<3 wt %). Moreover, inorganic material has features of UV resistance, thermal resistance and weather resistance. But the shortcoming is that during the thermal process, the clay may aggregate that leads to reduction of light diffusion and light transmittance.

Refer to U.S. Pat. No. 6,871,994, a light diffusion layer having polymer beads dispersed within a binder is coated on a surface of transparent polymer substrate to form a diffusion film. The beads are transparent and colorless with excellent light transmittance while its shortcomings are poor UV resistance, thermal resistance and weather resistance, all worse than inorganic particles.

Refer to Taiwanese Pat. No. 1237127, a diffusion plate with higher transmittance is disclosed. The diffusion plate features on that an anti-reflective layer is added on an incident surface thereof so that the light transmittance is increased 5%. Yet the disadvantage of this device is that the process for coating the anti-reflective layer increases the cost.

Refer to Taiwanese Pub. No. 200523626, a method for producing diffusion sheet with UV inhibition is disclosed. The advantage of the method is that yellowing and deformation of the diffusion sheet can be avoided after being used. But the UV adsorbent being used are organic materials so that the materials are easy to have degradation after absorbing UV light.

Refer to Taiwanese Pub. No. 200506035, a diffusion plate with high light transmission efficiency and excellent color tone is disclosed. The advantage of this invention is in that the diffusion sheet has excellent thermal resistance and deformation resistance due to organic UV absorbent and stabilizer added during manufacturing processes. The shortcoming is that besides addition of diffusion agents, addition of the UV absorbent and stabilizer will make the whole system more complicated and this has negative effect on stability of the whole system. Moreover, the overall production cost is also increased. Furthermore, after the UV absorbent reacting with UV light, the diffusion sheet is easy to have degradation.

SUMMARY OF THE INVENTION

In order to achieve electric neutrality, cation adsorption happens among clay mineral particles because of internal charge deficiencies. Cations absorbed by the clay are easy to be replaced by other organic or inorganic cations. By introduction of organic-modified agent, intercalation reactions happen between the sheets of the clay and the d-spacing of the clay platelets is enlarged. After organic modification, exfoliation and fine dispersion of the clay layers within the polymer matrix happen to form clay/polymer composite materials. Moreover, the optical, mechanical and thermal properties of the composite material are improved.

In the applications of composite material, clay features on its special physical, chemical and mechanical properties. Clay is generally an inorganic mineral formed as a silicate consisting of $Al_2O_3$ and $SiO_2$. The diameter of the clay particles is about 1 micrometer. The clay particle structure includes hundreds to thousands stacks of parallel clay sheets separated from one another. On average, each granule has about 850 silicate sheets. The aspect ratio of each sheet ranges from 100 to 1000 while the average cubic ratio is 100 nm×100 nm×1 nm. The d-spacing between the two contagious sheets is about 6 to 17 Å while 11 to 13 Å is preferably.

According to ions between the two sheets, the clay materials are divided into three groups: an anion-exchange type, a cation-exchange type and neutral ion-exchange type. Most of the cations are $Li^+$, $Na^+$, $Ca^{2+}$, $Mg^{2+}$, $Ba^{2+}$, $La^{2+}$, and $Ce^{2+}$. The clay also includes some water of crystallization. These cations provide cation exchange capacity (CEC) that presents the capacity of the clay for ion exchange of positively charged ions between the clay and the solution and this value may vary along with different materials.

There are various kind of clays which includes common minerals such as Smectite, Mica, Vermiculite, Brittle Mica, etc. Among them, Montmorillonite inside cation-exchange type clay of the Smectite is often used.

Therefore it is a primary object of the present invention to provide a diffusion sheet that is usually attached below the LCD panel for dispersing light beams received from the light source and providing uniform light for the LCD panel. Compare with traditional diffusion sheet that is formed by adding a plurality of chemical granules inside substrate working as scattering particles, the diffusion sheet available now consists of microparticles dispersed between resin layers. When light beams pass through the diffusion layer, they are reflected and scattered continuingly between the two substrates with different refractive indices for achieving diffusion effect.

According to research articles, nano-scale clay is not only applied to diffusion particles of the diffusion sheet but also is anti-reflection & UV resistant. With reflection resistance, utilization rate of the light source is optimized and brightness of the whole backlight module is further improved. As to UV resistance, life time of the diffusion sheet is extended. Therefore, the application of nano-scale clay to the diffusion sheet not only improves light diffusion effect but also has anti-reflection and UV resistance.

In the present invention, nano-scale Montmorillonite clay is used as diffusion particles and advantages thereof are mentioned above. Nowadays on the market, optical films are getting more compact and light weighted. Thus conventional diffusion plates formed by a thermal process is negated by using the coating process of the subject method. The coating process is energy-saving and is suitable for mass-production. Paint made by dispersing nano-scale clay in the resin is coated on transparent substrate by wet precision coating so as to form diffusion sheets. Another advantage of the wet coating process under normal temperature is that stability of dispersion of nano-particles is under control so that the dispersion effect is far more better than the thermal process. Moreover, if resin used is curable, the diffusion sheet further has features of abrasion and scratch resistance.

The technology used by the present invention includes wet grinding & dispersion technology and wet precision coating technology of nano-scale clay. By nano-scale wet grinding & dispersion technology, the nano-scale clay goes through swelling & wetting, intercalation, interface modification and dispersion and then is added with resin so as to form paints while the wet precision coating technology is applied to coating process for producing diffusion sheets. For example, Micro-Gravure coating is used.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein The FIGURE is a schematic drawing showing that two sides of polymer membrane are coated with diffusion layer.

DETAILED DESCRIPTION OF THE PREFERRED EMBODIMENT

In this embodiment, the clay is montmorillonite (Southern Clay Co.) with cation exchange capacity (CEC) of 120 meq/100 g, the d-spacing is 12.41 Å, thermal stability up to 500 Celsius degrees. The experimental steps consist of preparation of paints, coating and optical measurement. The transparent substrate used in this embodiment is PET (Polyethylene Terephthalate) 10, as shown in the FIGURE.

(1) Preparation of Paints

Put 500 g montmorillonite clay, 2450 g toluene, 50 g dispersant into a ball mill for swelling, wetting and dispersion. (a) premixing: before grinding, the clay is set into a mixer with speed setting at 1000 rpm for 2 hours for swelling and wetting pretreatment. (b) grinding: using zirconium oxide beads with diameter from 0.3 to 0.4 mm and volume that occupies 70% of the mill. The rotation speed of the ball miller is 3000 rpm and processing time for grinding & dispersion is 2 hours. After 2 hours, the d-spacing of the montmorillonite clay increases from 12.41 Å into 60.4 Å and the size distribution is from $d(50)=2.3$ μm(micrometer) to $d(50)=150$ nm(nano-meter). Now the viscosity of the suspension is 20 cps measured under 22 degrees Celsius, 20 rpm.

In order to prepare paints having various solid content, a certain amount of optical acrylic (UV curing) rasin is added into the suspension and form a paint, so as to adjust the solid content into 3 wt % (weight percent), 4 wt %, and 5 wt %. Now the viscosity is about 120 cps (measured under 22 degrees Celsius, 20 rpm). After 30 days of a sedimentation test, there is no precipitate. This means the paint is quite stable.

(2) Coating Experiment

As shown in to the FIGURE, top and bottom sides of 5 cm square sized PET membrane 10 is treated by primer and then is lighted by a UV lamp for drying so as to increase binding of the PET membrane with the acrylic resin. Then by a way of spin coating, the paint is coated on top and bottom sides of the PET membrane homogeneously. Then the coated membrane is dried and cross-linked by the UV lamp so as to from an abrasion and scratch resistance diffusion layer 11, 12, as shown in the FIGURE.

(3) Optical Measurement

This experiment measures haze and the measured data is as following:

| Solid content | Transmittance (%) | Reflection (%) | Haze (%) | Pencil hardness test |
|---|---|---|---|---|
| 0 | 97 | 23 | — | 2B |
| 3 wt % | 94 | 4.3 | 81 | 7H |
| 4 wt % | 90 | 4.1 | 83 | 7H |
| 5 wt % | 88 | 3.9 | 85 | 7H |

It is learned from above list that by only addition of 3 wt % nano-scale clay, reflection is reduced from 23% to 4.3% with transmittance of 94% and haze of 81%. The result show that the diffusion sheet manufactured by the present invention not only has features of easy-manufacturing, energy savings and low cost of raw material but also has abrasion and scratch resistance.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A low cost and simple method for preparation of diffusion sheets comprising the steps of:
    mixing a composition essentially consisting of nano-clay particles, toluene and a dispersant to form a diffusion layer paint;
    preparing a substrate by coating an acrylic resin on said substrate;
    drying said acrylic resin coated on said substrate to form a layered coated substrate;
    applying said diffusion layer to at least one surface of said layered coated substrate;
    drying and cross-linking said diffusion layer by applying UV light to form said diffusion sheet.

2. The method as claimed in claim 1, wherein cation exchange capacity of the nano-scale clay ranges from 90 to 150 meq/100 g while aspect ratio of nano-scale clay ranges from 100 to 1000.

3. The method as claimed in claim 1, wherein the resin includes optical curable acrylic resin.

4. The method as claimed in claim 1, wherein the wet coating process includes wet roll coating micro-gravure coating, spray coating, dip coating and spin coating.

* * * * *